United States Patent
Kim et al.

(10) Patent No.: US 8,565,056 B2
(45) Date of Patent: Oct. 22, 2013

(54) METHOD OF GENERATING TRACKING ERROR SIGNAL, OPTICAL PICKUP DEVICE, AND OPTICAL DISC DRIVE DEVICE ADOPTING THE METHOD

(75) Inventors: Ui-yol Kim, Suwon-si (KR); Yong-jae Lee, Suwon-si (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 41 days.

(21) Appl. No.: 13/299,172

(22) Filed: Nov. 17, 2011

(65) Prior Publication Data

US 2012/0134252 A1    May 31, 2012

(30) Foreign Application Priority Data

Nov. 25, 2010  (KR) .................. 10-2010-0118104

(51) Int. Cl.
*G11B 7/00* (2006.01)

(52) U.S. Cl.
USPC .................. 369/53.23; 369/53.28; 369/44.41

(58) Field of Classification Search
USPC ......... 369/44.34, 53.23, 53.28, 44.41, 124.12
See application file for complete search history.

(56) References Cited

U.S. PATENT DOCUMENTS

| | | | | |
|---|---|---|---|---|
| 5,787,060 A | * | 7/1998 | Ando | 369/44.42 |
| 6,563,773 B1 | | 5/2003 | Yanagisawa et al. | |
| 6,636,464 B1 | * | 10/2003 | Lee et al. | 369/44.23 |
| 7,649,825 B2 | * | 1/2010 | Tsuchida et al. | 369/112.07 |
| 7,764,575 B2 | * | 7/2010 | Okamoto | 369/44.23 |
| 2005/0265153 A1 | * | 12/2005 | Stallinga et al. | 369/44.41 |
| 2009/0168618 A1 | * | 7/2009 | Yamazaki | 369/47.14 |
| 2010/0135146 A1 | * | 6/2010 | Asada et al. | 369/112.23 |
| 2011/0013502 A1 | * | 1/2011 | Tatsu et al. | 369/112.03 |

FOREIGN PATENT DOCUMENTS

| | | |
|---|---|---|
| JP | 2005-243073 | 9/2005 |
| JP | 2006-054006 | 2/2006 |
| KR | 10-2001-0027859 | 4/2001 |
| KR | 10-2007-0079914 | 8/2007 |

OTHER PUBLICATIONS

Korean Office Action issued Nov. 19, 2012 in counterpart Korean Patent Application No. 10-2010-0118104 (4 pages, in Korean).

\* cited by examiner

*Primary Examiner* — Thomas Alunkal
(74) *Attorney, Agent, or Firm* — NSIP Law (57) ABSTRACT

A method of generating a 1-beam tracking error signal (TES), an optical pickup device, and an optical disc drive device adopting the method. A light-receiving element receives a single reflection beam and detects an alternating current (AC) component and a direct current (DC) component from each of areas formed on two sides of a data track. A servo unit generates a TES by adding and subtracting the AC component and the DC component.

20 Claims, 7 Drawing Sheets

PPAC = (A+D)−(B+C)+OL Shift

FIG. 6B

PPDC = (E+H)−(F+G)+OL Shift

FIG. 6C

CCP = PPAC−k∗(PPDC)

METHOD OF GENERATING TRACKING ERROR SIGNAL, OPTICAL PICKUP DEVICE, AND OPTICAL DISC DRIVE DEVICE ADOPTING THE METHOD

CROSS-REFERENCE TO RELATED PATENT APPLICATION

This application claims the benefit of Korean Patent Application No. 10-2010-0118104, filed on Nov. 25, 2010, in the Korean Intellectual Property Office, the entire disclosure of which is incorporated herein by reference for all purposes.

BACKGROUND

1. Field

The following description relates to a tracking method on an optical disc, and more particularly, to a single beam tracking method, an optical pickup device, and an optical disc drive device adopting the method.

2. Description of the Related Art

Optical pickup devices for an optical disc drive device have a structure in which a plurality of optical systems for maintaining multimedia compatibility are integrated into one body. For example, optical pickup devices having compatibility with a compact disc (CD), a digital versatile disc (DVD), and a Blu-ray disc (BD) include an optical system for a CD/DVD and an optical system for a BD separately. Optical pickup devices generally include an optical system for a CD/DVD and an optical system for a BD which share some of the components needed for reading and/or recording to and from the respective media. For example, the optical path of optical pickup devices used for BD media generally overlap with at least part of the optical path of an optical pickup device used for CD/DVD media. Such optical pickup devices have a design in which optical elements are very densely disposed. Thus, such optical pickup devices have a very low degree of design freedom.

An optical system may be designed having a plurality of lenses, such as a lens for a CD/DVD and a lens for a BD. The plurality of lens are arranged on a tracking control line in a tracking control direction (i.e., in a so-called radial direction) such that a line passing through the plurality of lenses passes through a rotational center of a medium (or turntable). This arrangement is generally applied to an optical pickup device for multimedia. However, the plurality of lenses need to be arranged in a direction perpendicular to the tracking control direction (i.e., in a so-called tangential direction) according to design conditions. In this regard, the lens for a CD/DVD or the lens for a BD deviates from the tracking control line. For example, when the lens for a CD/DVD is designed to be located on the tracking control line in the radial direction, the lens for a BD is located in a position that deviates from the tracking control line. In other words, the lens for a BD is located in an offset position. Thus, it is not easy to perform tracking control on the optical system in which an objective lens is located in the offset position, by using a so-called 3-beam method.

SUMMARY

In one general aspect, there is provided a method of generating a tracking error signal (TES). The method includes forming a beam spot on a data track of a medium, the medium comprising a data line in which data are recorded and a non-data line formed at two sides of the data line, directing light of the beam spot reflected off the medium so as to be incident on a light-receiving element that is split into a plurality of sectors, separately detecting a plurality of direct current (DC) signals and a plurality of alternating current (AC) signals from the plurality of sectors of the light-receiving element, and obtaining a TES from the separately-detected AC signals and DC signals.

The light-receiving element may include an AC light-receiving sector and a DC light-receiving sector that are respectively disposed on two sides of an axis in a tangential direction parallel to the data track.

An axis in a tangential direction parallel to the data track and an axis in a radial direction perpendicular to the axis in the tangential direction may split the light-receiving element into four areas, each of the areas comprising at least one AC light-receiving sector and at least one DC light-receiving sector.

The at least one AC light-receiving sector and the at least one DC light-receiving sector of each of the four areas may be disposed symmetrically with respect to the axis in the radial direction.

The at least one AC light-receiving sector and the at least one DC light-receiving sector of each of the four areas may be disposed symmetrically with respect to the axis in the radial direction, and between two areas adjacent to each other and separated by the axis in the radial direction, the at least one AC light-receiving sector in one area is adjacent to the at least one AC light-receiving sector in the other area.

The obtaining of the TES may include obtaining an AC difference signal between AC light-receiving sectors arranged on two sides in a track direction, obtaining a DC difference signal between DC light-receiving sectors arranged on the two sides in the track direction, and obtaining the TES signal using the DC difference signal and the AC difference signal.

The obtaining of the TES may include obtaining a sum of AC signals of AC light-receiving sectors arranged on one side of an axis in a tangential direction and a sum of AC signals of AC light-receiving sectors arranged on another side of the axis in the tangential direction, obtaining a sum of signals of DC light-receiving sectors arranged on one side of the axis in the tangential direction and a sum of DC signals of DC light-receiving sectors arranged on the other side of the axis in the tangential direction, obtaining an AC difference signal between the sums of AC signals, obtaining a DC difference signal between the sums of DC signals, and obtaining the TES signal using the DC difference signal and the AC difference signal.

In another aspect, there is provided an optical pickup device. The optical pickup device includes a light source configured to provide light configured to reproduce data to a medium, the medium comprising a data track, an objective lens configured to form a beam spot by focusing a beam from the light source on the data track of the medium, and a light-receiving element comprising at least two alternating current (AC) detection sectors and at least two direct current (DC) detection sectors each configured to detect light reflected off the medium on which the beam spot is formed, as an electrical signal and separately detecting AC signals and DC signals generated due to the data track.

An axis in a tangential direction parallel to the data track and an axis in a radial direction perpendicular to the axis in the tangential direction may split the light-receiving element into four areas, each of the four areas comprising at least one AC light-receiving sector and at least one DC light-receiving sector.

An axis in a tangential direction parallel to the data track and an axis in a radial direction perpendicular to the axis in the tangential direction may split the light-receiving element into four areas, each of the four areas comprises at least one AC light-receiving sector and at least one DC light-receiving sector, the at least one AC light-receiving sector and the at least one DC light-receiving sector of each of the four areas are disposed symmetrically with respect to the axis in the radial direction, and between two areas adjacent to each other and separated by the axis in the radial direction, the at least one AC light-receiving sector in one area is adjacent to the at least one AC light-receiving sector in the other area.

An axis in a tangential direction parallel to the data track and an axis in a radial direction perpendicular to the axis in the tangential direction may split the light-receiving element into four areas, each of the four areas comprises at least one AC light-receiving sector and at least one DC light-receiving sector, the at least one AC light-receiving sector and the at least one DC light-receiving sector of each of the four areas are disposed symmetrically with respect to the axis in the radial direction, the at least one AC light-receiving sector in one area between two areas adjacent to each other and separated by the axis in the radial direction is adjacent to the at least one AC light-receiving sector in the other area, and one DC light-receiving sector is disposed on an outside of each area.

A mirror may be disposed on one side of the objective lens, and the mirror reflects the beam from the light source onto the objective lens and reflects light from the objective lens.

A separate objective lens facing the medium may be disposed on one side of the objective lens, and the two objective lenses may be arranged in a tangential direction.

The separate objective lens may be disposed on a tracking control axis in a radial direction that passes through the separate objective lens and a rotational center of the medium.

In another aspect, an optical disc drive is provided. The optical disc drive includes an optical pickup device, an information processing unit configured to process a signal output from the optical pickup device, a servo unit configured to generate a control signal for the optical pickup device, and a controlling unit configured to control the information processing unit and the servo unit, wherein the optical pickup device includes a light source configured to provide light configured to reproduce data to a medium, the medium comprising a data track, an objective lens configured to form a beam spot by focusing a beam from the light source on the data track of the medium, and a light-receiving element comprising at least two alternating current (AC) detection sectors and at least two direct current (DC) detection sectors each configured to detect light reflected off the medium on which the beam spot is formed, generating an electrical signal based on the detected light, and separately detecting AC signals and DC signals generated due to the data track.

The servo unit may detect a tracking error signal (TES) of an objective lens by obtaining an AC difference signal between AC light-receiving sectors arranged on two sides in a track direction, obtaining a DC difference signal between DC light-receiving sectors arranged on the two sides in the track direction, and obtaining the TES signal using the AC different signal and the DC difference signal.

The servo unit may detect a TES of the objective lens by obtaining a sum of AC signals in AC light-receiving sectors arranged on one side of the axis in a tangential direction and a sum of AC signals of AC light-receiving sectors arranged on another side of the axis in the tangential direction, obtaining a sum of DC signals in DC light-receiving sectors arranged on one side of the axis in the tangential direction and a sum of DC signals of DC light-receiving sectors arranged on the other side of the axis in the tangential direction, obtaining an AC difference signal between the sums of AC signals, obtaining a DC difference signal between the sums of DC signals, and obtaining the TES signal using the AC difference signal and the DC difference signal.

The optical disc drive may be included in an electronic device.

The electronic device may be one of a portable game console, a portable/personal multimedia player (PMP), a portable lap-top PC, a desktop PC, a high definition television (HDTV), and an optical disc player.

In another aspect, a method of generating a tracking error signal (TES) is provided. The method includes directing light to a medium, the medium comprising a data track which includes (i) a data line in which data is recorded, and (ii) two non-data lines disposed on opposing sides of the data line, the light being directed to the medium so as to form a beam spot on the data track of the medium, directing light reflected off the medium so as to be incident on a light-receiving element having a plurality of sectors each of which detects light and generates an electric signal based on the detected light, separately detecting a plurality of direct current (DC) signals and a plurality of alternating current (AC) signals generated by the light-receiving element, and determining a TES based on the plurality of DC signals and the plurality of AC signals.

Other features and aspects may be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Figure 1:
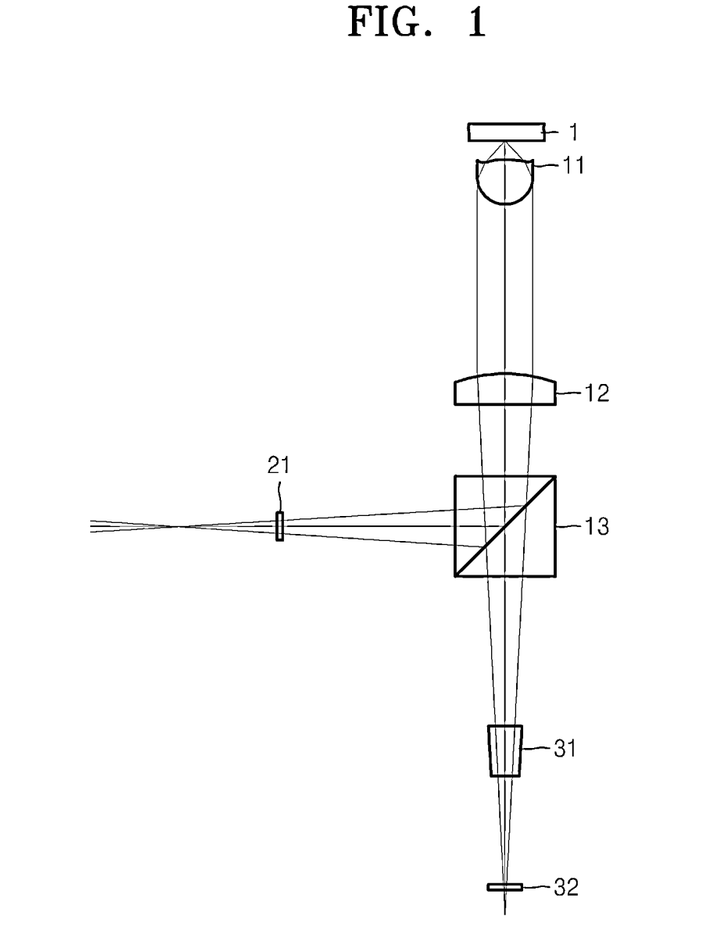
FIG. 1 is a diagram that illustrates a an example of an optical pickup device.

FIG. 1 illustrates a schematic of an example of a structure of elements of an optical pickup device.

Referring to FIG. 1, a beam irradiated from a light source 21 is reflected off a beam splitter 13 and is incident on a medium 1 via a collimating lens 12 and an objective lens 11. Light reflected off the medium 1 is incident on a light-receiving element 32 via the objective lens 11, the collimating lens 12, the beam splitter 13, and a sensing lens 31. The beam splitter 13 transmits the light reflected off the medium 1 and reflects the beam that is irradiated from the light source 21. However, the positions of the light source 21 and the light-receiving element 32 may be switched. Accordingly, in such examples, the beam splitter 13 may have optical characteristics for reflecting the light reflected off the medium 1 and for transmitting the beam irradiated from the light source 21.

Figure 2:
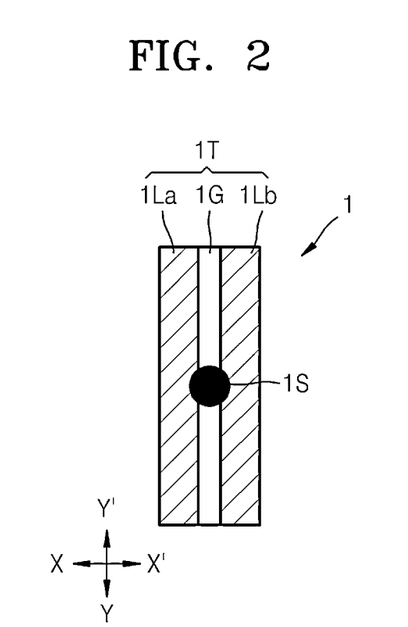
FIG. 2 is a diagram that illustrates an example of a form in which a single beam is incident on a track of the optical pickup device illustrated in FIG. 1.

FIG. 2 illustrates is a diagram that illustrates an example of a form in which a single beam is incident on a track of the optical pickup device illustrated in FIG. 1.

The optical pickup device described above does not include a diffraction element for 3-beam separation, which is generally used in a conventional 3-beam method. Thus, a single beam spot is formed on the medium 1. The medium 1 may be shaped as a disc. As an example, a track 1T of the medium 1 is arranged in a tangential direction Y-Y' and is formed as a line tangent to a rotational circular arc of the medium 1, and tracking control is performed in a radial direction X-X' that is perpendicular to the tangential direction Y-Y'. FIG. 2 illustrates an example in which the track 1T is disposed linearly. However, the track 1T may have a spiral shape in which a rotational axis of the medium 1 is centered and has a partially circular arc shape.

The medium 1 includes a data line in the tangential direction Y-Y' in which data are recorded and a non-data lines formed at each of two sides of the data line in the tangential direction Y-Y'. Generally, the data line in which data are recorded is referred to as a groove, and the non-data line formed at each of the two sides of the data line in the tangential direction Y-Y' is referred to as a land. For the sake of conciseness, detailed descriptions of physical characteristics of the groove and the land are excluded, the groove refers to a data area in which data are recorded, and the land refers to a non-data area formed at each of two sides of the data area and in which data are not recorded. Thus, the groove and the land do not limit a particular physical structure of the medium 1. As an example, the land may include two sections, each of the two sections of the land being formed on sides of the data line so as oppose each other.

Referring to FIG. 2, one beam spot 1S is formed centered on a groove 1G in which data are recorded. Edge portions of the beam spot 1S are also formed on portions of lands 1La and 1Lb. For example, portions of the lands 1La and 1Lb, on which the edge portions of the beam spot 1S are formed, are areas having widths that vary in a push-pull shape during a tracking operation of the objective lens 11 performed using a servo unit. Accordingly, an alternating signal is generated as the widths vary. The edge portions of the beam spot 1S are diffracted by the lands 1La and 1Lb, and accordingly a reflected beam spot 1S' (described later with reference to FIG. 3) having a so-called baseball shape and a predetermined size is formed on the light-receiving element 32. In other words, the lands 1La and 1Lb diffract light (e.g., those portions of the beam spot that are irradiated on the lands) differently than the groove 1G. Accordingly, the pattern of the light reflected off the medium (e.g., the reflected beam spot 1S') has an irregular shape that differs from the light originally irradiated on the medium 1 (e.g, beam spot 1S).

Figure 3:
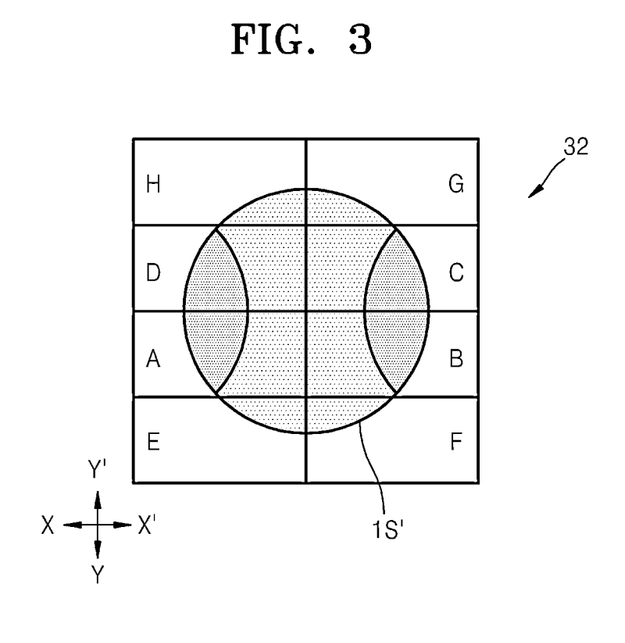
FIG. 3 is a diagram that illustrates an example of a light-receiving element of the optical pickup device of FIG. 1.

FIG. 3 illustrates an example of a sector-splitting structure of the light-receiving element 32 applied to the optical pickup device of FIG. 1.

Referring to FIG. 3, the light-receiving element 32 is split into four areas by using an axis in the tangential direction Y-Y' that passes through a center of the light-receiving element 32 and an axis in the radial direction X-X'. Each of the four areas is spilt into two areas. As an example, axis X-X' may be perpendicular to axis Y-Y'. The four areas each may be split into two areas along axis that is parallel to axis X-X'.

The reflected beam spot 1S' overlaps all of sectors A, B, C, D, E, F, G, and H of the light-receiving element 32 and has a baseball shape, as described above. For example, darkly-indicated outer portions of the reflected beam spot 1S' (e.g., as illustrated on the right and left sides of the reflected beam spot 1S') overlapping the sectors A, B, C, and D are portions where $+1^{st}$ light and $-1^{st}$ light diffracted by the lands 1La and 1Lb overlap each other, and via the overlapping portions, an electrical signal having an alternating current (AC) component is generated. Portions of the reflected beam spot 1S' overlapping the sectors E, F, G, and H at corners of the light-receiving element 32 are portions reflected by the groove 1G. An electrical signal having a direct current (DC) component may be generated based on the overlapping portions.

The light-receiving element 32 may include an arrangement of sectors for separately detecting the signal having an AC component and the signal having a DC component. In particular, the light-receiving element 32 may separately detect the signal having an AC component generated via the lands 1La and 1Lb formed on sides of the groove 1G. The signal having an AC component is detected by the adjacent sectors B and C and A and D, and the signal having a DC component is detected by the outer sectors F and G and E and H.

A tracking error signal (TES) may be obtained by obtaining an difference between detected AC signals. For example, a TES may be obtained by calculating or determining an AC difference signal between a sum A+D of AC components of one side of the light-receiving element 32 and a sum B+C of AC components of another side of the light-receiving element 32 and by removing a DC component value caused by offset from the AC difference signal. For example, the TES may be determined by using Equation 1:

TES={(A+D)−(B+C)}−k{DC component value}     [Equation 1]

where the DC component value is generated when a position of the reflected beam spot 1S' deviates from a tracking control axis (or line), and thus as the objective lens 11 shifts from a track position in the radial direction X-X', the DC component value increases.

Figure 4:
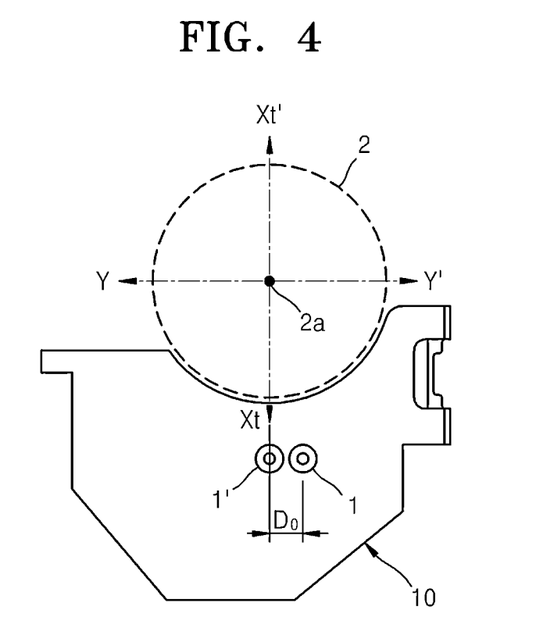
FIG. 4 is a diagram that illustrates an example of objective lenses arranged on a tracking error control axis of an optical pickup device including a plurality of lenses.

FIG. 4 illustrates an example of an objective lens 11 arranged with respect to a rotational center 2a of a spindle motor 2 for rotating a medium. The objective lens 11 may be disposed on an optical pickup device 10 together with an additional objective lens 11'. The additional objective lens 11' may be disposed on a tracking control axis Xt-Xt' passing through the rotational center 2a of the spindle motor 2 in a radial direction. On the other hand, the objective lens 11 is offset from the tracking control axis Xt-Xt' by a predetermined offset distance $D_o$. The predetermined offset distance $D_o$ may correspond to the distance between the objective lens 11 and the additional objective lens 11'. The additional objective lens 11' may be an objective lens for a first medium (e.g., a CD/DVD), and the offset objective lens 11 may be an objective lens for a second medium (e.g., a BD).

Figure 5:
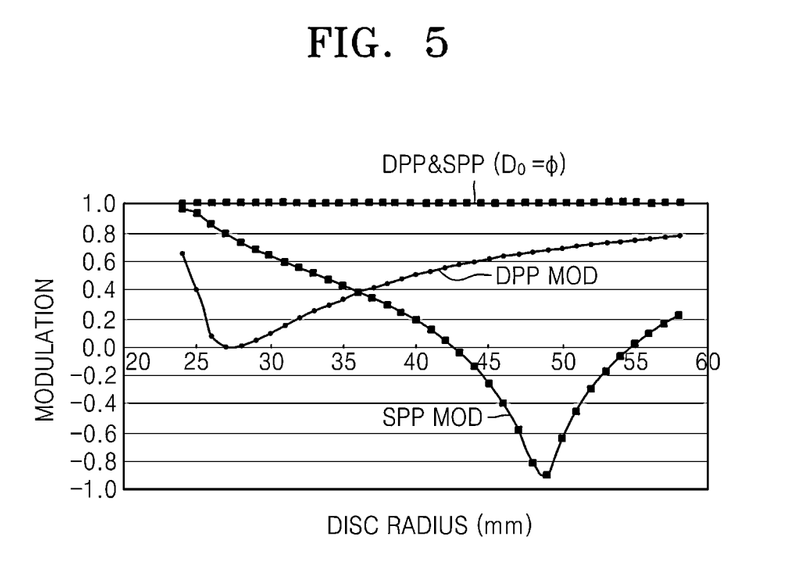
FIG. 5 is a graph illustrating an example of a modulation of a differential push pull (DPP) signal and a sub push pull (SPP) signal versus a disc radius in an optical pickup device including an offset objective lens, by using a conventional 3-beam method.

FIG. 5 is a graph illustrating an example of level modulation of a differential push pull (DPP) signal and a sub push pull (SPP) signal generated when the offset distance $D_o$ of the objective lens 11 is 0 and when the offset difference $D_o$ of the objective lens 11 is 0.4 mm, by using a conventional 3-beam method.

As illustrated in FIG. 5, when $D_o$=0, i.e., if the objective lens 11 is located on the tracking control axis Xt-Xt', then both the DPP signal and the SPP signal are "1" and are not modulated. However, if the objective lens 1 deviates from the tracking control axis Xt-Xt', then modulation occurs according to a change of a distance between the objective lens 1 and a center of a disc, as indicated in lower curves. Accordingly, the conventional 3-beam method cannot be applied when the objective lens 11 is offset.

This above-described phenomenon occurs as a results of a difference in amounts of incident sub-beams formed on lands of a track according to a position of the objective lens 11 when the objective lens 11 of the optical pickup device 10 is offset from the tracking control axis Xt-Xt'. As an example, a single beam method may be applied to the optical pickup device 10 having the offset objective lens 11. The TES is obtained by properly adding and subtracting AC and DC signals generated by the light-receiving element 32, as described above in Equation 1.

The DC component value in Equation 1 is obtained by adding and subtracting signals from DC light-receiving sectors of the light-receiving element 32, as shown in Equation 2:

DC component value=$(E+H)-(F+G)$ [Equation 2]

The DC component value compensates for lens shift of a push pull AC (PPAC) signal and is multiplied by a constant k. Accordingly, the TES is obtained using Equation 3:

TES=$\{(A+D)-(B+C)\}-k\{(E+H)-(F+G)\}$ [Equation 3]

Based on Equation 3, sectors A and D and the sectors B and C are summed up. When obtaining the TES, the adjacent sectors A and D may exist as one sector, and the adjacent sectors B and C may also exist as another sector. Each of the four-split areas of the light-receiving element 32 may have one AC sector and one DC sector. As an example, a focus error signal (FES) may be detected in this manner. If the sectors A, D, B, and C need to be separated from one another the FES may be detected. The sectors A, D B, and C may need to be separated from one another in obtaining the FES.

Figure 6A:
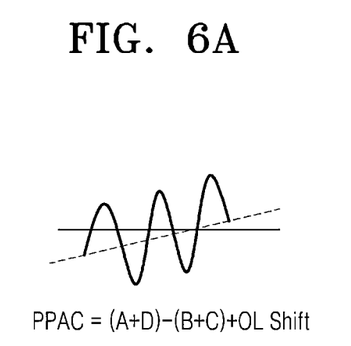
FIGS. 6A through 6C are diagrams that illustrate an example of a method of finally obtaining a tracking error signal (TES) in an optical pickup device including an offset objective lens.
Figure 6B:
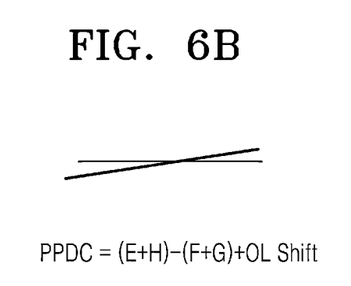
Figure 6C:
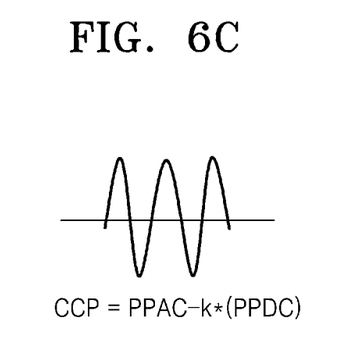

FIG. 6A is a graph illustrating an example of a PPAC signal that includes an offset value caused by objective lens (OL) shift. FIG. 6B is a graph illustrating an example of a push pull DC (PP DC) signal including an offset value caused by OL shift. FIG. 6C is a graph illustrating an example of a difference signal between the PPAC signal and the PPDC signal that indicates a TES finally obtained via confocal push pull (CPP). In other words, in response to lens offset, a DC offset may be used to offset an AC signal that occurs with a single beam. In response to detecting a reflected beam spot formed on the light-receiving element 32, an AC area and a DC area are separately detected so that the TES, as illustrated in FIG. 7, is stably obtained by using the method described above.

Figure 7:
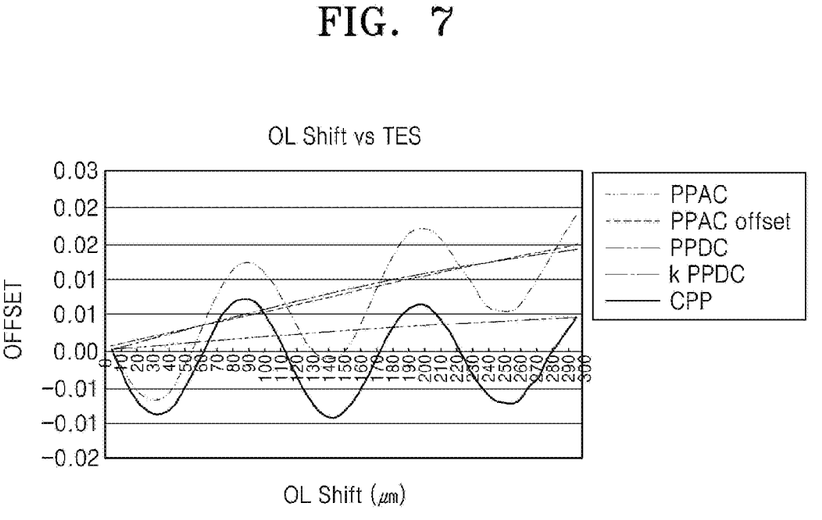
FIG. 7 is a graph illustrating an example of a result of a TES simulation regarding shift of an objective lens in an optical pickup device including the offset objective lens.

FIG. 7 illustrates an example of a result of a TES simulation relating to lens shift in an optical pickup device including an offset objective lens.

In FIG. 7, PPAC represents an original signal obtained from an AC area $\{(A+D)-(B+C)\}$, and PPAC offset represents a DC component of PPAC. PPDC is a DC value obtained from a DC area, and k PPDC represents a DC value obtained by multiplying PPDC by a constant k (approximately PPAC/PPDC) determined to compensate for the DC component of PPAC. A TES may be obtained stably by performing CPP (1-beam push pull) whereby k PPDC is subtracted from PPAC, as illustrated in FIGS. 6A through 6C.

Figure 8:
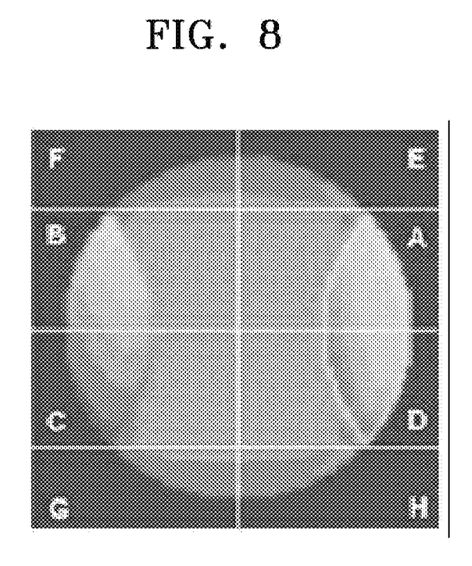
FIG. 8 is an image illustrating an example of a simulation in which reflected light is incident on the light-receiving element of the optical pickup device of FIG. 1.

FIG. 8 is an image illustrating an example of a simulation in which reflected light is incident on the light-receiving element 32 of the optical pickup device of FIG. 1. As illustrated in FIG. 8, portions caused by $\pm1^{st}$ beams are generated on sides of a waist portion of the light-receiving element 32 and thus a baseball-like form is generated.

Table 1 shows a relationship between an FES and a TES and the sectors of the light-receiving element 32, on which reflected light is incident, as shown in FIG. 8.

TABLE 1

| Error Detection Method | | Operation |
| --- | --- | --- |
| FES | AD(Single Astigmatism) | (A + E + C + G) − (B + F + D + H) |
| TES | CPP(1BEAM PUSH-PULL) | {(A + D) − (B + C)} − k{(E + H) − (F + G)} |

As an example, CPP as described above may be applied to the optical pick up device. In another aspect, an optical pickup device including the additional objective lens 11 described above may be provided. In other words, in another aspect, the structures and methods described above may be applied to a multimedia compatible optical pickup device. In this regard, the additional objective lens 11' described above may be located on a tracking control axis (or line). Accordingly, a conventional 3-beam method may be applied to the additional objective lens 11'. However, as an example, CPP described above may instead be applied to the additional objective lens 11'.

Figure 9:
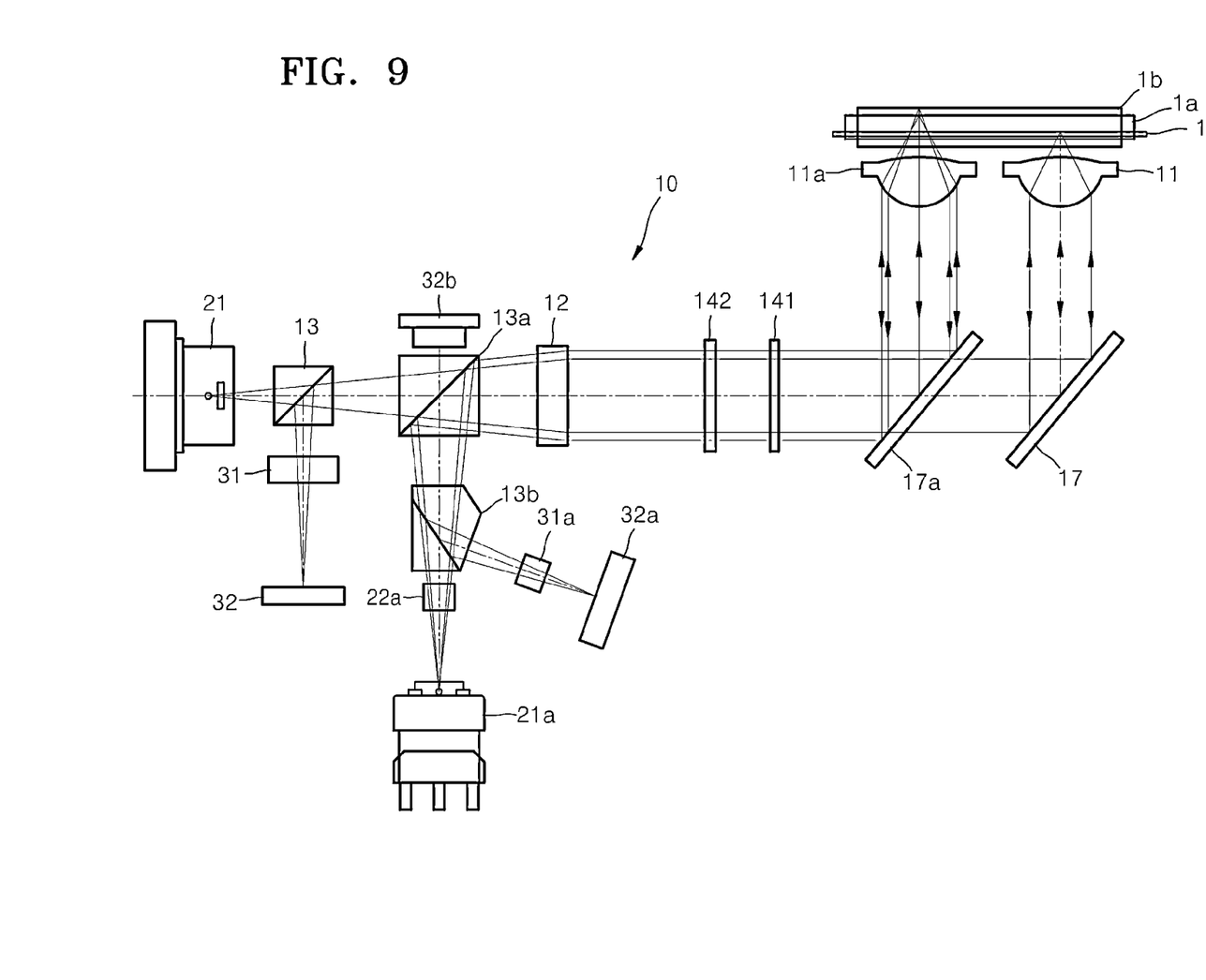
FIG. 9 is a diagram that illustrates an example of an optical pickup device.

FIG. 9 illustrates an example of an optical pickup device. Referring to FIG. 9, a compatible optical pickup device 10 may include an objective lens 11 for a first medium 1 (e.g., a BD 1) that focuses first light from a light source 21 having a first wavelength (e.g., a wavelength of 405 nm) on the first medium 1 (e.g., a BD 1), and the light-receiving element 32 described above, for detecting the first light reflected off the first medium (e.g., a BD 1). The light-receiving element 32 may be split into two areas by a line extending in a track extending direction. The two areas may each include four-split areas H, D, A, and E and G, C, B, and F respectively, as illustrated in FIG. 3.

As an example, a first beam splitter 13 that is an optical converter for passing the first light toward the first medium (e.g., a BD 1) and for reflecting the first light reflected off the first medium (e.g., a BD 1) and onto the light-receiving element 32 is disposed on an optical path between the light source 21 and the objective lens 11 for the first medium (e.g., a BD 1). As a non-limiting example, a sensing lens 31 is disposed on an optical path between the first beam splitter 13 and the light-receiving element 32 so as to detect an FES by using astigmatism, and the like. A polarization control element 142, a second beam splitter 13a, a collimating lens 12, a quarter wavelength plate 141, and a dichromatic mirror 17a are disposed on an optical path between the first beam splitter 13 and a reflection mirror 17 in a light proceeding direction toward the first medium (e.g., a BD 1). As an example, dichromatic mirror 17a transmits third light for the first medium (e.g., a BD 1) and reflects second light for a second medium 1b (e.g., a CD 1b) and for a third medium 1a (e.g., a DVD 1a)

toward an additional objective lens 11a for a second or third medium 1b or 1a (e.g., a CD/DVD).

A 3-beam generation diffraction element 22a and a third beam splitter 13b are disposed on a light proceeding path between a light source a for a second or third medium 1b or 1a (e.g., a CD/DVD) and the second beam splitter 13a. A sensing lens 31a having a well-known structure and a 3-beam light-receiving element 32a for a second or third medium 1b or 1a (e.g., a CD/DVD) are disposed on a proceeding path of light reflected off the third beam splitter 13b. A monitoring light-receiving element 32b for monitoring amounts of light of the light sources 21 and 21a is disposed on one side of the second beam splitter 13a.

As an example, the above-described structure is a structure in which an optical system for a first medium (e.g., a BD) using a 1-beam method and an optical system for a second or third medium (e.g., a CD/DVD) using a 3-beam method are formed together. An AC component and a DC component as described above may be separately detected by using the optical system for the first medium (e.g., a BD) using a 1-beam method. Accordingly, the AC component and the DC component are used in generating a TES.

Descriptions of a light-receiving element and a method of generating a TES by using a signal from the light-receiving element in one aspect are summarized below.

As an example, in the light-receiving element, an AC light-receiving sector and a DC light-receiving sector are respectively disposed on sides of an axis in a tangential direction parallel to a track. In another aspect, the light-receiving element is split by the axis in the tangential direction parallel to the track and on an axis in a radial direction perpendicular to the tangential direction to form four areas on the light-receiving element, and at least one AC light-receiving sector and at least one DC light-receiving sector are disposed on each of the four areas.

For example, the light-receiving element may have an AC light-receiving sector and a DC light-receiving sector disposed symmetrically with respect to the axis in the radial direction.

As another example, the AC light-receiving sectors and DC light-receiving sectors of each area may be disposed symmetrically with respect to the axis in the radial direction, and between two areas adjacent to each other separated by the axis in the radial direction, the AC light-receiving sectors of one area may be adjacent to the AC light-receiving sectors of the other area.

For example, determining a TES and a method of generating a TES may include: obtaining an AC difference signal between AC light-receiving sectors disposed on sides separated by a line in a track direction; obtaining a DC difference signal between DC light-receiving sectors disposed on the sides; and obtaining a TES using the DC difference signal and the AC difference signal.

Specifically, the determining of a TES and the method of generating a TES includes: obtaining a sum of AC signals of AC light-receiving sectors arranged on one side of an axis in a tangential direction and a sum of AC signals of AC light-receiving sectors arranged on another side of the axis in the tangential direction; obtaining a sum of DC signals of DC light-receiving sectors arranged on one side of the axis in the tangential direction and a sum of DC signals of DC light-receiving sectors arranged on the other side of the axis in the tangential direction; obtaining an AC difference signal between the sums of AC signals; obtaining a DC difference signal between the sums of DC sum signals; and obtaining a TES using the DC difference signal and the AC difference signal.

Figure 10:
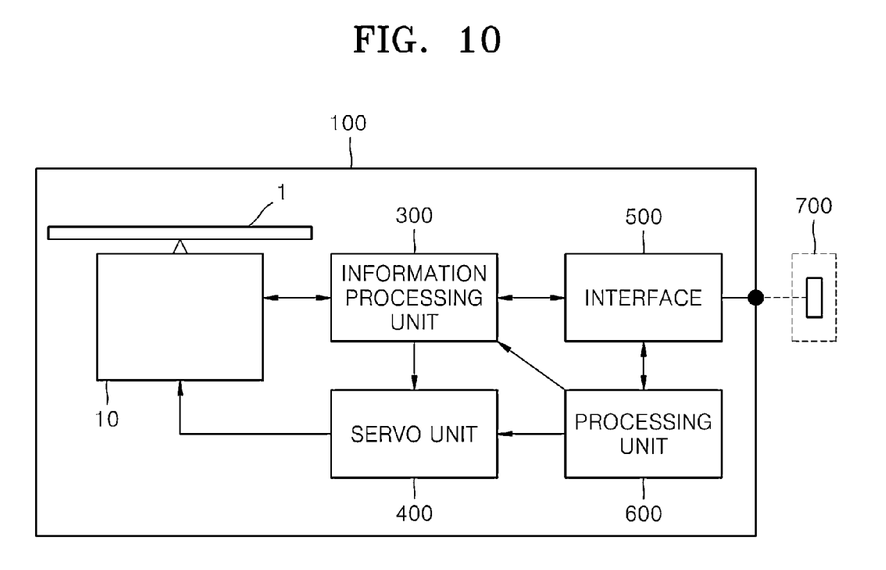
FIG. 10 is a diagram that illustrates an example of an optical disc drive device.

FIG. 10 illustrates an example of an optical disc drive device 100 including an optical pickup device.

Referring to FIG. 10, the optical disc drive device 100 includes an optical pickup device 10 that reads or writes information from or in the disc 1, 1a, or 1b. The optical pickup device 10 includes an optical system described above and a mechanical system that supports the optical system mechanically and performs, for example, focusing and tracking operations. The optical system includes an encoder/decoder and is connected to an information processing unit 300 connected to an interface 500 for connecting to an external host (e.g, computer 700). The mechanical system is connected to a servo unit 400. The information processing unit 300, the servo unit 400, and the interface 500 are controlled by a controlling unit 600. The interface 500 may include a connection (e.g., a universal serial bus (USB) port) that follows various protocols, for example. Thus, the interface 500 may be connected to a computer 700 or other terminal as a host, for example, based on a predetermined connection standard. For example, the interface 500 may be connected to a computer 700 using a USB protocol. The interface 500 and the computer 700 or other terminal thereby exchange information.

The servo unit 400 of the optical disc drive device 100 uses a TES method described above. In other words, the servo unit 400 detects a TES of an objective lens on a medium by obtaining an AC difference signal between AC light-receiving sectors arranged at two sides in a track direction, obtaining a DC difference signal between DC light-receiving sectors arranged at the two sides in the track direction, and obtaining a TES using the DC difference signal and the AC difference signal.

For example, the servo unit 400 detects a TES of an objective lens on a medium by obtaining a sum of AC signals of AC light-receiving sectors arranged at one side of an axis in a tangential direction and a sum of AC signals of AC light-receiving sectors arranged on another side of the axis in the tangential direction, obtaining a sum of DC signals of DC light-receiving sectors arranged at one side of the axis in the tangential direction and a sum of DC signals of DC light-receiving sectors arranged on the other side of the axis in the tangential direction, obtaining an AC difference signal between the sums of AC signals; obtaining a DC difference signal between the sums of DC signals, and obtaining a TES using the DC difference signal and the AC difference signal.

An optical pickup device using a 1-beam method for tracking control may be efficiently performed by using a method of generating a TES using a structure in which a beam spot is formed on a position offset from a tracking control axis that passes through a plurality of lenses and a rotational center of a medium. Such tracking control increases a degree of design freedom of an optical pickup device. In another aspect, the optical pickup device may be applied to a structure in which an objective lens for a BD of a CD/DVD compatible optical pickup device is offset from a reference position.

In some aspects described herein provide a method of generating a tracking error signal (TES) whereby tracking control may be efficiently performed on an pickup device, for example, an optical pickup device, using an objective lens offset from a radial direction by using a single beam, an optical pickup device, and an optical disc drive device adopting the method.

The optical pickup device may be included in an electronic device. As a non-exhaustive illustration only, an electronic device described herein may refer to mobile devices such as a digital camera, a portable game console, a portable/personal multimedia player (PMP), a portable lap-top PC, and devices such as a desktop PC, a high definition television (HDTV), an optical disc player, a setup box, and the like capable of wireless communication or network communication consistent with that disclosed herein.

A terminal (which is sometimes referred to as a computer terminal) may be an electronic or electromechanical hardware device that is used for entering data into, and displaying data from, a host computer or a host computing system. The function of a terminal can be confined to display and input of data; though a terminal with significant local programmable data processing capability may be called a "smart terminal" or fat client. A terminal that depends on the host computer for its processing power is called a thin client. A personal computer can run software that emulates the function of a terminal, sometimes allowing concurrent use of local programs and access to a distant terminal host system.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of generating a tracking error signal (TES), the method comprising:
    forming a beam spot on a data track of a medium, the medium comprising a data line in which data are recorded and a non-data line formed at two sides of the data line;
    directing light of the beam spot reflected off the medium so as to be incident on a light-receiving element which is split into a plurality of sectors;
    separately detecting a plurality of direct current (DC) signals and a plurality of alternating current (AC) signals from the plurality of sectors of the light-receiving element; and
    obtaining a TES from the separately-detected AC signals and DC signals,
    wherein an axis in a radial direction perpendicular to the data track splits the light receiving element into two areas, each of the areas comprising at least one AC light-receiving sector and at least one DC light-receiving sector.

2. The method of claim 1, wherein the AC light-receiving sector and the DC light-receiving sector are respectively disposed on two sides of an axis in a tangential direction parallel to the data track.

3. The method of claim 1, wherein an axis in a tangential direction parallel to the data track further splits the two areas of the light-receiving element into four areas, each of the four areas comprising at least one AC light-receiving sector and at least one DC light-receiving sector.

4. The method of claim 3, wherein the at least one AC light-receiving sector and the at least one DC light-receiving sector of each of the four areas are disposed symmetrically with respect to the axis in the radial direction.

5. The method of claim 3, wherein the at least one AC light-receiving sector and the at least one DC light-receiving sector of each of the four areas are disposed symmetrically with respect to the axis in the radial direction, and between two areas adjacent to each other and separated by the axis in the radial direction, the at least one AC light-receiving sector in one area is adjacent to the at least one AC light-receiving sector in the other area.

6. The method of claim 1, wherein the obtaining of the TES comprises:
    obtaining an AC difference signal between AC light-receiving sectors arranged on two sides in a track direction;
    obtaining a DC difference signal between DC light-receiving sectors arranged on the two sides in the track direction; and
    obtaining the TES signal using the DC difference signal and the AC difference signal.

7. The method of claim 1, wherein the obtaining of the TES comprises:
    obtaining a sum of AC signals of AC light-receiving sectors arranged on one side of an axis in a tangential direction and a sum of AC signals of AC light-receiving sectors arranged on another side of the axis in the tangential direction;
    obtaining a sum of signals of DC light-receiving sectors arranged on one side of the axis in the tangential direction and a sum of DC signals of DC light-receiving sectors arranged on the other side of the axis in the tangential direction;
    obtaining an AC difference signal between the sums of AC signals;
    obtaining a DC difference signal between the sums of DC signals; and
    obtaining the TES signal using the DC difference signal and the AC difference signal.

8. An optical pickup device comprising:
    a light source configured to provide light for reproducing data to a medium, the medium comprising a data track;
    an objective lens configured to form a beam spot by focusing a beam from the light source on the data track of the medium; and
    a light-receiving element comprising at least two alternating current (AC) light-receiving sectors and at least two direct current (DC) light-receiving sectors each configured to detect light reflected off the medium on which the beam spot is formed, as an electrical signal and separately detecting AC signals and DC signals generated due to the data track,
    wherein an axis in a radial direction perpendicular to the data track splits the light receiving element into two areas each of the areas comprising at least one of AC light-receiving sectors and at least one of the DC light-receiving sectors.

9. The optical pickup device of claim 8, wherein an axis in a tangential direction parallel to the data track further splits the two areas of the light-receiving element into four areas, each of the four areas comprising at least one of the AC light-receiving sectors and at least one of the DC light-receiving sectors.

10. The optical pickup device of claim 8, wherein an axis in a tangential direction parallel to the data track further split the two areas of the light-receiving element into four areas, each of the four areas comprises at least one of the AC light-receiving sectors and at least one of the DC light-receiving sectors, the at least one AC light-receiving sector and the at least one DC light-receiving sector of each of the four areas are disposed symmetrically with respect to the axis in the radial direction, and between two areas adjacent to each other and separated by the axis in the radial direction, the at least one AC light-receiving sector in one area is adjacent to the at least one AC light-receiving sector in the other area.

11. The optical pickup device of claim 8, wherein an axis in a tangential direction parallel to the data track further splits the two areas of the light-receiving element into four areas, each of the four areas comprises at least one of the AC light-receiving sectors and at least one of the DC light-receiving sectors, the at least one AC light-receiving sector and the at least one DC light-receiving sector of each of the four areas are disposed symmetrically with respect to the axis in the radial direction, the at least one AC light-receiving sector in one area between two areas adjacent to each other and separated by the axis in the radial direction is adjacent to the at least one AC light-receiving sector in the other area, and one DC light-receiving sector is disposed on an outside of each area.

12. The optical pickup device of claim 8, wherein a mirror is disposed on one side of the objective lens, and the mirror reflects the beam from the light source onto the objective lens and reflects light from the objective lens.

13. The optical pickup device of claim 8, wherein a separate objective lens facing the medium is disposed on one side of the objective lens, and the two objective lenses are arranged in a tangential direction.

14. The optical pickup device of claim 13, wherein the separate objective lens is disposed on a tracking control axis in a radial direction which passes through the separate objective lens and a rotational center of the medium.

15. An optical disc drive device comprising:
an optical pickup device;
an information processing unit configured to process a signal output from the optical pickup device;
a servo unit configured to generate a control signal for the optical pickup device; and
a controlling unit configured to control the information processing unit and the servo unit,
wherein the optical pickup device comprises:
a light source configured to provide light configured to reproduce data to a medium, the medium comprising a data track;
an objective lens configured to form a beam spot by focusing a beam from the light source on the data track of the medium; and
a light-receiving element comprising at least two alternating current (AC) light-receiving sectors and at least two direct current (DC) light-receiving sectors each configured to detect light reflected off the medium on which the beam spot is formed, generating an electrical signal based on the detected light, and separately detecting AC signals and DC signals generated due to the data track,
wherein an axis in a radial direction perpendicular to the data track splits the light receiving element into two areas, each of the areas comprising at least one of the AC light-receiving sectors and at least one of the DC light-receiving sectors.

16. The optical disc drive device of claim 15, wherein the servo unit detects a tracking error signal (TES) of an objective lens by obtaining an AC difference signal between the AC light-receiving sectors which are arranged on two sides in a track direction, obtaining a DC difference signal between the DC light-receiving sectors which are arranged on the two sides in the track direction, and obtaining the TES signal using the AC different signal and the DC difference signal.

17. The optical disc drive device of claim 15, wherein the servo unit detects a TES of the objective lens by obtaining a sum of the AC signals in the AC light-receiving sectors which are arranged on one side of the axis in a tangential direction and a sum of the AC signals of the AC light-receiving sectors which are arranged on another side of the axis in the tangential direction, obtaining a sum of the DC signals in the DC light-receiving sectors which are arranged on one side of the axis in the tangential direction and a sum of the DC signals of the DC light-receiving sectors which are arranged on the other side of the axis in the tangential direction, obtaining an AC difference signal between the sums of AC signals, obtaining a DC difference signal between the sums of DC signals, and obtaining the TES signal using the AC difference signal and the DC difference signal.

18. An electronic device, the electronic device including the optical disc drive device of claim 15.

19. The electronic device of claim 18, wherein the electronic device is one of a portable game console, a portable/personal multimedia player (PMP), a portable lap-top PC, a desktop PC, a high definition television (HDTV), and an optical disc player.

20. A method of generating a tracking error signal (TES), the method comprising:
directing light to a medium, the medium comprising a data track which includes (i) a data line in which data is recorded, and (ii) two non-data lines disposed on opposing sides of the data line, the light being directed to the medium so as to form a beam spot on the data track of the medium;
directing light reflected off the medium so as to be incident on a light-receiving element having a plurality of sectors each of which detects light and generates an electric signal based on the detected light;
separately detecting a plurality of direct current (DC) signals and a plurality of alternating current (AC) signals generated by the light-receiving element; and
determining a TES based on the plurality of DC signals and the plurality of AC signals,
wherein an axis in a radial direction perpendicular to the data track splits the light receiving element into two areas, each of the areas comprising at least one AC light-receiving sector and at least one DC light-receiving sector.

* * * * *